(12) United States Patent
Averbuch et al.

(10) Patent No.: US 9,894,336 B2
(45) Date of Patent: Feb. 13, 2018

(54) COLOR IMAGING USING A MONOCHROMATIC DIGITAL CAMERA

(71) Applicant: Ramot at Tel-Aviv University Ltd., Tel-Aviv (IL)

(72) Inventors: Amir Averbuch, Tel Aviv (IL); Michael Golub, Rehovot (IL); Menachem Nathan, Tel Aviv (IL); Roman Malinsky, Holon (IL); Valery Zheludev, Tel Aviv (IL)

(73) Assignee: Ramot at Tel-Aviv University Ltd, Tel-Aviv (IL)

( * ) Notice: Subject to any disclaimer, the term of this patent is extended or adjusted under 35 U.S.C. 154(b) by 77 days.

(21) Appl. No.: 14/905,811

(22) PCT Filed: Jul. 31, 2014

(86) PCT No.: PCT/IB2014/063580
§ 371 (c)(1),
(2) Date: Jan. 17, 2016

(87) PCT Pub. No.: WO2015/019251
PCT Pub. Date: Feb. 12, 2015

(65) Prior Publication Data
US 2016/0156891 A1    Jun. 2, 2016

Related U.S. Application Data

(60) Provisional application No. 61/861,982, filed on Aug. 3, 2013.

(51) Int. Cl.
*H04N 9/04* (2006.01)
*G01N 3/28* (2006.01)
(Continued)

(52) U.S. Cl.
CPC ............. *H04N 9/43* (2013.01); *G01J 3/0205* (2013.01); *G01J 3/28* (2013.01); *G01J 3/2823* (2013.01); *G02B 5/201* (2013.01); *H04N 9/045* (2013.01)

(58) Field of Classification Search
CPC .................................... H04N 9/43; G01J 3/02
(Continued)

(56) References Cited

U.S. PATENT DOCUMENTS

2005/0234302 A1  10/2005  MacKinnon et al.
2008/0088841 A1*  4/2008  Brady ................. G01J 4/04
                                                         356/365

(Continued)

FOREIGN PATENT DOCUMENTS

WO        2014203151 A1    12/2014

OTHER PUBLICATIONS

Arguello et al, "Restricted Isometry Propertry in coded aperture compressive spectral imaging", IEEE Statistical Signaling Processing Workshop (SSP), Aug. 5, 2012, pp. 716-719.
(Continued)

*Primary Examiner* — Joel Fosselman
(74) *Attorney, Agent, or Firm* — Nathan & Associates Patent Agents Ltd; Menachem Nathan

(57) ABSTRACT

Monochromatic cameras and methods for using such cameras to obtain a still or video color image of an object or scene. The image sensor of such cameras is clear, without a color filter array. A diffused-dispersed and optionally randomized image of the object or scene obtained at the image sensor is processed directly into a number R<K of spectral images in R wavebands. K-R spectral images are interpolated from the R spectral images. A color image is then reconstructed using the directly processed R spectral images and the K-R interpolated spectral images. The interpolated
(Continued)

images may exemplarily be obtained using a spline subdivision algorithm.

23 Claims, 6 Drawing Sheets

(51) Int. Cl.
*H04N 9/43* (2006.01)
*G01J 3/28* (2006.01)
*G02B 5/20* (2006.01)
*G01J 3/02* (2006.01)

(58) Field of Classification Search
USPC .......................................... 348/273; 356/326
See application file for complete search history.

(56) References Cited

U.S. PATENT DOCUMENTS

2013/0194481 A1 8/2013 Golub et al.
2016/0171653 A1 6/2016 Mendlovic et al.

OTHER PUBLICATIONS

Greer et al, "Accurate resconstruction of hyperspectral images from compressive sensing measurements", SPIE-International Society for Optical Engineering Proceesings, May 31, 2013, pp. 8717OE, vol. 8717.

Extended European Search Report issued in related EP patent application No. 14833949.2 dated Mar. 22, 2017. 9 pages.

International Search Report and Written Opinion issued in related PCT patent application PCT/IB2014/063580 dated Jan. 6, 2015, 8 pages.

D.H. Foster et al., "Frequency of metamerism in natural scenes", Journal of the Optical Society of America A, 23, pp. 2359-2372, 2006.

R.M. Willett et al., "Multiscale reconstruction for computational spectral imaging" Electronic Imaging 2007, International Society for Optics and Photonics, pp. 64980L-64980L-15. 2007.

* cited by examiner

COLOR IMAGING USING A MONOCHROMATIC DIGITAL CAMERA

CROSS REFERENCE TO EXISTING APPLICATIONS

This application is a 371 application from international patent application PCT/IB2014/063580, and is related to and claims priority from U.S. Provisional Patent Application No. 61/861,982 having the same title and filed Aug. 3, 2013, which is incorporated herein by reference in its entirety.

FIELD

Embodiments disclosed herein relate in general to imaging using a digital still or video camera, and in particular to color imaging (also referred to herein as "color photography") using a monochromatic digital still or video camera having a clear image sensor, i.e. a sensor without a color filter array (CFA).

BACKGROUND

Color imaging with a digital camera (in both still and video mode) as known today is performed using a pixelated image sensor that has a CFA, most often a Bayer pattern of R (red), G (green) and B (blue) filters. For simplicity, such a camera will be referred to henceforth as "RGB camera". The CFA pixels are arranged to match image sensor pixels. With the decreasing size of modern image sensor pixels (which approaches the wavelength of light), the signal level for a given photon flux per pixel decreases and the capture of each photon becomes crucial. Color filters prevent most (in some cases ca. 70%) of the photons from reaching the image sensor and therefore affect significantly such parameters as sensitivity and signal-to-noise ratio (SNR). Moreover, the fabrication of CFAs, which requires a number of masking and deposition stages, is costly.

A color image is essentially a weighted combination of RGB "band" images. Thus, a color image can be "constructed" (or "reconstructed") to match an original imaged object if its RGB components are known. Each R, G and B band is itself a weighted combination of many separate spectral or hyperspectral ("HS") images at distinct wavelengths (or bands) within the R, G or B band. As used herein, the term "hyperspectral" refers exemplarily to more than ca. 10 wavelengths. Consequently, a RGB color image may be reconstructed from spectral or hyperspectral image data, for example as described in D. H. Foster et al., "Frequency of metamerism in natural scenes", Journal of the Optical Society of America A, 23, 2359-2372 (2006). However, such reconstruction is currently severely limited by the time and processing resources needed to acquire the HS data and by the time and processing resources needed to reconstruct the color image from the HS data.

PCT patent application PCT/IB2014/062270, filed 16 Jun., 2014 by the present inventors and titled "Apparatus and method for snapshot spectral imaging" teaches snapshot (single shot) HS imaging using a monochromatic digital camera that has a minimal hardware addition in the form of a restricted isometry property (RIP) diffuser element. The digital camera is adapted to provide a large number of spectral images in a snapshot. The spectral images are reconstructed from a single diffused-dispersed (DD) image, which is a single image obtained at the image sensor through the camera and the RIP diffuser. A hardware or software randomizer may be added to the camera with the RIP diffuser to provide a single diffused-dispersed and randomized (DDR) image at the image sensor. The reconstruction of spectral images from a single DD or DDR image described in PCT/IB2014/062270 is performed using compressed sensing (CS) algorithms. More specifically, PCT/IB2014/062270 teaches two dimensional (2D) CS-based spatial-spectral cube reconstruction (SCR) or "2D CS-SCR".

There would be clearly a tremendous advantage in terms of both camera performance and image sensor fabrication costs if color images in both still and video mode could be obtained with a monochromatic digital camera having a "clear" image sensor that does not have color filters. Moreover, there is a need for and it would be advantageous to have monochromatic digital cameras and associated methods that can provide such images in real time and with restricted processing resources.

SUMMARY

The present inventors have determined that a color image in still mode or a series of images (frames) in video mode can be obtained using a monochromatic still or video digital camera with a clear sensor. The color image is obtained in a single shot as with digital cameras having color sensors (in which the pixels are covered with a CFA, normally a Bayer-type RGB filter array). The description continues with detailed reference to a still mode digital camera, but is clearly applicable to video mode. A snapshot DD or DDR image is taken with the monochromatic digital camera. An "HS-originated color image" of size $X \times Y$ is reconstructed from K images of size $X \times Y$ at K spectral bands (which represent a "data cube" of size $X \times Y \times K$) obtained from the DD or DDR image. For simplicity, hereinafter "color image" is used instead of "HS-originated color image". Some of the K spectral images used in the reconstruction of the color image are interpolated from directly reconstructed spectral images. Specifically, for a set of K spectral images used in color image reconstruction, R spectral images (R<K) are reconstructed directly from the DD image and K−R spectral images are interpolated. The direct spectral image reconstruction is performed preferably using 2D CS-SCR and may involve Bregman iterations, as described exemplarily in PCT/IB2014/062270. The reconstruction of a K-band HS image $J=\{J_k\}$, k=0, ..., K−1, from the available set of bands $J_r^2=\{J_{2^r l}\}$, l=0, ..., K/$2^r$−1, is performed exemplarily using the binary spline subdivision algorithms described exemplarily in A. Z. Averbuch, P. Neittaanmaki, and V. A. Zheludev, "Spline and spline-wavelet methods with applications to signal and image processing, Volume I: Periodic splines", Springer, 2014 (hereinafter "ANZ-book1"). The number of Bregman iterations needed to obtain an acceptable quality color image may be determined using some preset or dynamic criterion or threshold. An "intermediate" color image may be formed after each Bregman iteration from spectral images reconstructed (directly and by interpolation) in that iteration.

Direct reconstruction of only R out of the K spectral images, followed by the interpolation of the remaining K−R images, provides significant time and computational resource savings, while not degrading significantly the quality of the color image. In particular, the time saving is expressed by the fact that the color image is obtained in a fraction of a second, i.e. in "real time", thereby also allowing video production.

Since color images cannot be shown, such images are converted herein to grayscale images in all the drawings.

In some embodiments there is provided a method for obtaining a color image of an object or scene using a camera having a pixelated clear image sensor without color filters, the method comprising the steps of obtaining a DD image at the image sensor in a snapshot, processing the DD image to obtain K spectral images in K spectral bands where K≥3, and reconstructing the color image from the K spectral images. The color image may be a still color image or a video color image or color frame. In some embodiments, the step of obtaining a DD image may include obtaining a diffused-dispersed and randomized (DDR) image. The step of processing the DD or DDR image may include processing the DD or DDR image to provide R<K spectral images in R wavebands and using the R images to obtain K–R interpolated images, and the step of reconstructing the color image from the K spectral images may include recontructing the color image using the R spectral images and the K–R interpolated spectral images. The interpolated images may be obtained using a spline subdivision algorithm. The spline subdivision algorithm may be a binary spline subdivision algorithm. Each spectral image may include a set X×Y of multipixels, each multipixel including K wavebands, and the interpolation may be performed simultaneously on the entire multipixel set.

In some embodiments there is provided a camera for obtaining a color image of an object or scene, comprising a lens, a pixelated clear image sensor without color filters, diffuser means to obtain in a snapshot a DD image at the image sensor, and a processor configured to process the DD image into K spectral images in K spectral bands where K≥3, and to reconstruct a color image from the K spectral images. The color image may be a still color image or a video color image or color frame. In an embodiment, the diffuser means include a RIP diffuser. In an embodiment, a camera includes a randomizer used in conjunction with the diffuser means to provide a DDR image at the image sensor. The randomizer may be a hardware randomizer or a software-implemented randomizer. The processor may be further configured to process directly the DD or DDR image into R spectral images in R wavebands (where R<K), to interpolate from the R spectral images K–R interpolated spectral images and to reconstruct the color image using the directly processed R spectral images and the K–R interpolated spectral images. The processor configuration to interpolate K–R interpolated spectral images may include a configuration to interpolate the K–R spectral images using a spline subdivision algorithm. The spline subdivision algorithm may be a binary spline subdivision algorithm.

BRIEF DESCRIPTION OF THE DRAWINGS

Aspects, embodiments and features disclosed herein will become apparent from the following detailed description when considered in conjunction with the accompanying drawings, wherein.

DETAILED DESCRIPTION

Figure 1A:
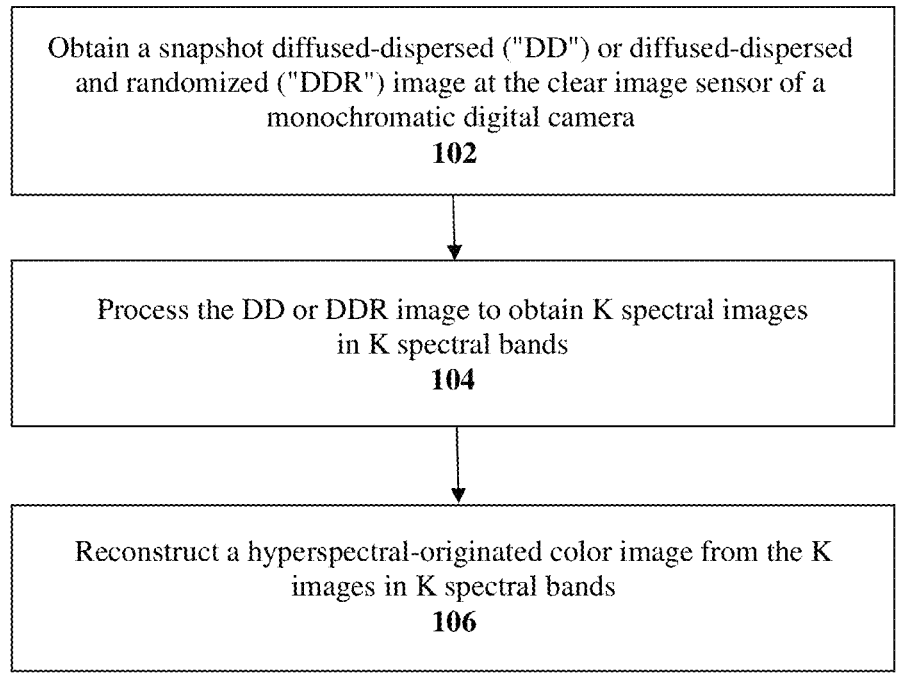
FIG. 1A shows schematically in a flow chart an embodiment of a method for obtaining a color image with a monochromatic digital camera disclosed herein.

FIG. 1A shows schematically in a flow chart an embodiment of a method for obtaining a color image with a monochromatic digital camera disclosed herein. In step 102, a snapshot DD or DDR image is obtained at the clear image sensor of the monochromatic camera, exemplarily as described in PCT/IB2014/062270. In step 104, the DD or DDR image is processed to obtain a number K of spectral images at K spectral bands, exemplarily as described in PCT/IB2014/062270. An HS-originated color image is then reconstructed from K bands in a reconstruction step 106.

Note that while the description continues with specific reference to a DD or DDR image for which enabling details are provided in PCT/IB2014/062270, the methods described herein may be applied to DD images obtained in a snapshot using diffusing means other than a RIP diffuser or randomizers described in PCT/IB2014/062270.

Figure 1B:
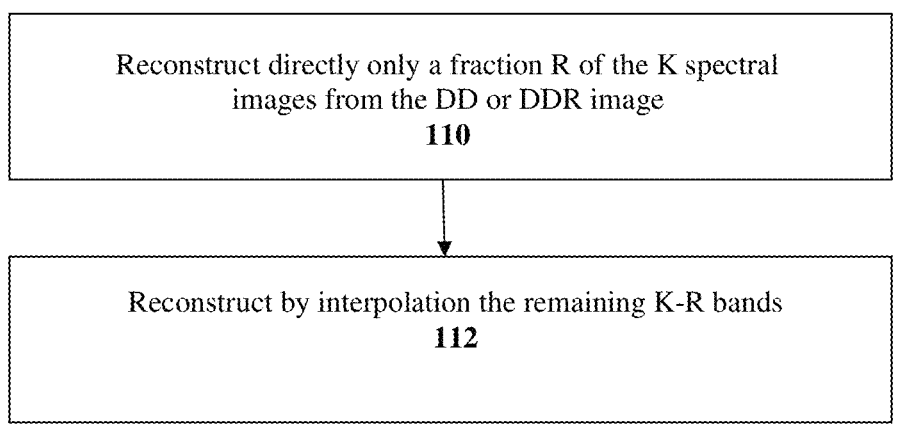
FIG. 1B shows details of step 106 in the flow chart of FIG. 1A.

Details of reconstruction step 106 are given in a flow chart FIG. 1B. The reconstruction includes direct reconstruction of only a fraction R out of the K spectral images (or bands) from the DD image the image sensor in step 110, and interpolated reconstruction of the remaining K–R bands in step 112. Steps 110 and 112 are performed simultaneously on all the pixels of the DD image rather than on single pixels. The interpolation to reconstruct the interpolated bands may be performed exemplarily using a binary spline subdivision algorithm.

An HS image J is represented by a data cube $C=(P_{ijk})$ in which $i=1, \ldots V$ and $j=1, \ldots H$ are the spatial variables and $k=0, \ldots, K-1$, is the spectral variable. The data cube is the collection of "multi-pixels" $C=\{M_{ij}\}$, $i=1, \ldots, V$, $j=1, \ldots, H$, where for a fixed $\bar{i}, \bar{j}$, the vector $M_{\bar{i},\bar{j}}=\{P_{\bar{i},\bar{j},k}\}$, $k=0, \ldots, K-1$.

Reconstruction of a Single Multi-Pixel (MP)

Denote by $\vec{m}=\{m[k]\}$, k=0, ..., K−1, a single MP to be reconstructed from incomplete data. We illustrate exemplarily the reconstruction of a single MP using a binary spline subdivision algorithm.

Binary Spline Subdivision Algorithm

Denote by $B^p(t)$ the B-spline of order p on the grid{l}, which is supported on the interval (−p/2, p/2). An explicit expression for the B-spline is:

$$B^p(t) = \frac{1}{(p-1)!} \sum_{k=0}^{p} (-1)^p \binom{p}{k} \left(t + \frac{p}{2} - k\right)_+^{p-1}, \quad (1)$$

$$t_+ = \begin{cases} t & \text{if } t \geq 0 \\ 0 & \text{otherwise} \end{cases}.$$

Assume, a data vector $\vec{m}_r^2 = \{m[2^r l]\}$, l=0, ..., K/$2^r$−1 is available. To approximately reconstruct the MP $\vec{m}$, reconstruct a spline $S^p(l)=m[2^r l]$ of even order p, which interpolates the data vector $\vec{m}_r^2$ on the grid{l}, and approximates the vector $\vec{m}$ by the vector $\tilde{\vec{m}}$ consisting of the spline values at diadic rational points:

$$\tilde{m}[k] = \begin{cases} S^p(l) = m[2^r l] & \text{if } k = 2^r l \\ S^p(l + s/2^r) & \text{if } k = 2^r l + s, s < 2^r \end{cases} \quad (2)$$

In an embodiment, the reconstruction of the MP may be implemented as follows:

1. Assume j is the smallest natural number such that $N=2^j > K/2^r$. Denote the Discrete Fourier transform (DFT) of the sampled B-spline by $$u[n] = \sum_{l=0}^{N-1} e^{-2\pi i l n/N} B^p(l), \quad (3)$$

$$u_r[n] = \sum_{l=0}^{2^r N - 1} e^{-2\pi i l n / 2^r N} B^p(l)$$

2. In order to use the DFT and to eliminate boundary effects, symmetrically expand the data vector $\vec{m}_r^2$ to the vector $\vec{x}=\{x[l]\}$, l=0, ..., N−1 whose length is N.

3. Calculate the DFT of the vector x:

$$\hat{x}[n] = \sum_{l=0}^{N-1} e^{-2\pi i l n/N} x[l] \quad (4)$$

4. Introduce the sequence $\hat{y}$ of length $2^r N$ $$\hat{y}[n] = 2^r \frac{u_r[n]}{u[n]} \hat{x}[n] \prod_{q=1}^{t} \cos^p \frac{\pi n}{2^q N} \quad (5)$$

5. Calculate the inverse Discrete Fourier transform (IDFT) of the sequence $\hat{y}$ $$y[n] = \frac{1}{2^r N} \sum_{n=0}^{2^r N - 1} e^{2\pi i l n / 2^r N} \hat{y}[n] \quad (6)$$

6. Symmetrically shrink the output vector y={y[l]} to the vector $\tilde{\vec{m}}=\{\tilde{m}[l]\}$ whose length K is equal to the length of the MP $\vec{m}$. The vector $\tilde{m}$ is equal to the values of the spline $S^p(t)$ (Eq. 2) and approximates the MP $\vec{m}$.

The spline subdivision algorithm described above is able to operate on a set rather than on a single vector. Thus, the operations above are implemented on all the multi-pixels simultaneously. Subdivision of a data cube of size 1367×609×33 takes a fraction of second, i.e. can be considered "real time".

Simulations of Color Image Reconstruction

Figure 2A:
FIG. 2A shows the original image of size 1367×609×33 used in the simulations.

To investigate an impact of reduction in the number of spectral bands used in the reconstruction on the quality of the color image, several computer simulations were run, and their results were compared with an original RGB image obtained directly from the spectral cube containing 33 original spectral bands (FIG. 2A). In terms K symbol used herein, here K=33. Comparison was done by visual analysis and by calculation of peak signal-to-noise ratio (PSNR).

Figure 2B:
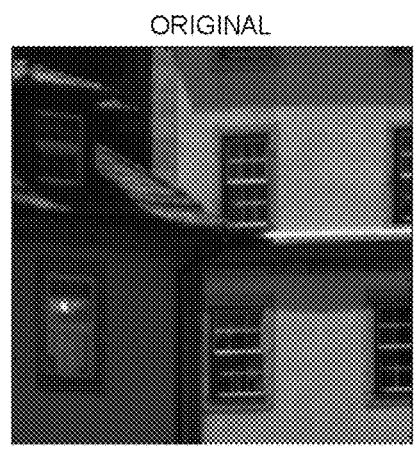
FIG. 2B shows on the left a fragment of the original image of size 256×256 used in the simulation and on the right the same fragment, where the RGB image was derived from 9 wavebands taken from the original spectral data and 24 wavebands interpolated using a binary spline subdivision algorithm.
Figure 2B:
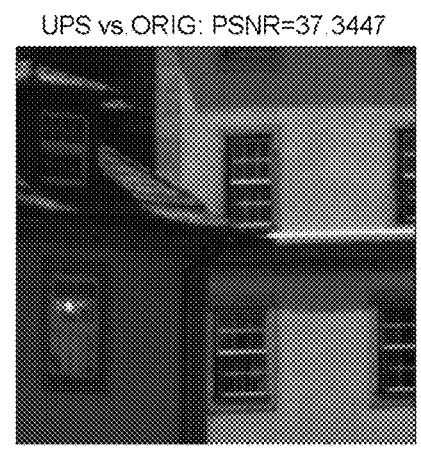

FIG. 2A shows the original color image converted to the grayscale format. The original color image is represented by an original "data cube" of 1367×609 pixels at 33 bands. That is, this color image is reconstructed of 33 bands, each band weighted with the appropriate weight, as described for example in Foster et al. above. FIG. 2B shows a fragment of size 256×256 of the original color image (converted to the grayscale format) vs. the same fragment reconstructed from 9 original and 24 interpolated spectral bands. In terms of R and K symbols used herein, here K=33, R=9 and K−R=24. The PSNR of the "interpolated" (up-sampled) RGB image with respect to the original one is 37.34 dB.

Figure 2C:
FIG. 2C shows separately Red, Green and Blue images of the above fragment derived from 33 original wavebands (top line triple view) vs. images derived from 9 original and 24 interpolated wavebands (bottom line triple view)
Figure 3:
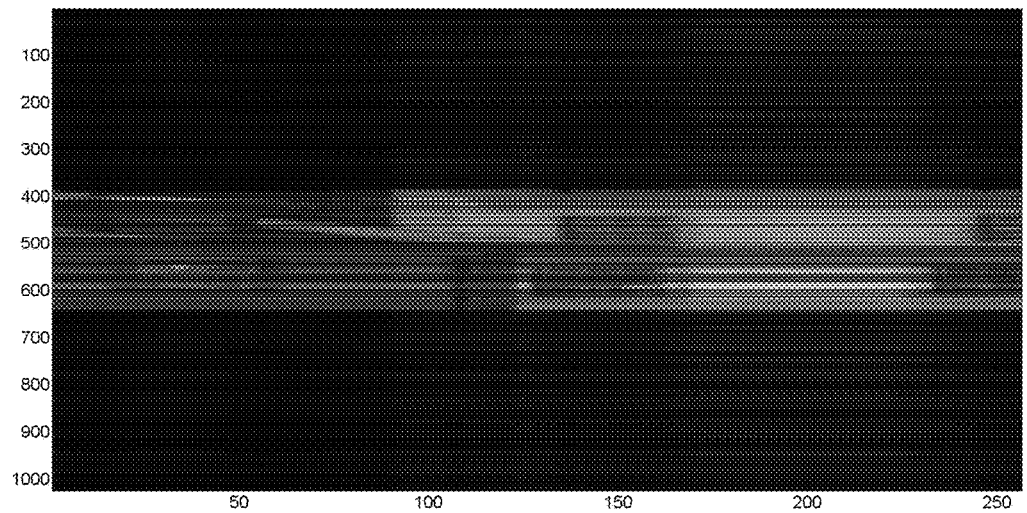
FIG. 3 shows the DD image of size 1024×256.

FIG. 2C shows separately R, G and B images of the above fragment derived from 33 original wavebands (top line) vs. images derived from 9 original and 24 interpolated wavebands (bottom line). In terms of R and K symbols used herein, here K=33, R=9 and K−R=24. The PSNR values for the R, G and B images are 40.31 dB, 41.79 dB and 32.61 dB, respectively;

FIG. 3 shows the DD image of size 1024×256, which is an input for the reconstruction algorithm Details of such an image may be found in PCT/IB2014/062270.

Figure 4A:
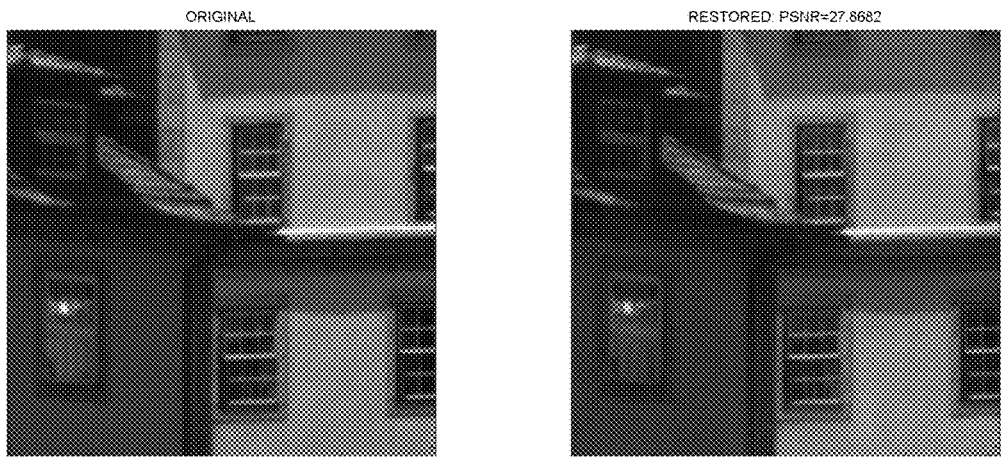
FIG. 4A shows on the left a fragment of the original image of size 256×256 and on the right the same fragment where the RGB image was derived from 9 wavebands restored from the DD image and 24 wavebands interpolated using a binary spline subdivision algorithm.
Figure 4B:
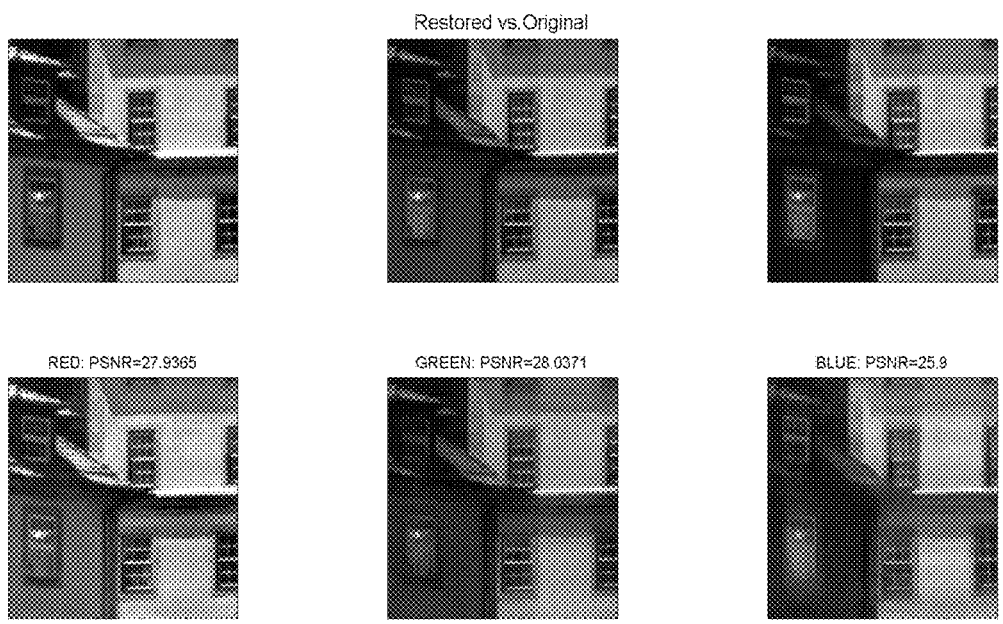
FIG. 4B shows separately Red, Green and Blue images of the above fragment derived from 33 original wavebands (top triple of pictures) vs. the images derived from 9 wavebands reconstructed from the DD image and 24 wavebands interpolated using a binary spline subdivision algorithm.

FIG. 4A shows on the left the above fragment of the original image (converted into the grayscale format) vs. on the right the same fragment reconstructed using 33 bands, where 9 wavebands were reconstructed from the DD image using the CS scheme described in PCT/IB2014/062270, and where 24 wavebands were interpolated from the 9 reconstructed wavebands using the binary spline subdivision algorithm. In terms of R and K symbols used herein, here K=33, R=9 and K−R=24. The PSNR value is 27.87 dB. FIG. 4B shows separately R, G and B images of the above fragment derived from 33 original wavebands (top line) vs. images derived from 9 wavebands restored from the DD image and 24 wavebands interpolated by the binary spline subdivision algorithm from the 9 restored wavebands (bottom line). The 9 waveband images were restored from the DD image by application of 17 Bregman iterations using the semi-tight frames originating from the quadratic quasiinterpolating splines introduced in ANZ-book1. The PSNR values for the R, G and B images are 27.94 dB, 28.04 dB and 25.9 dB, respectively.

Figure 5:
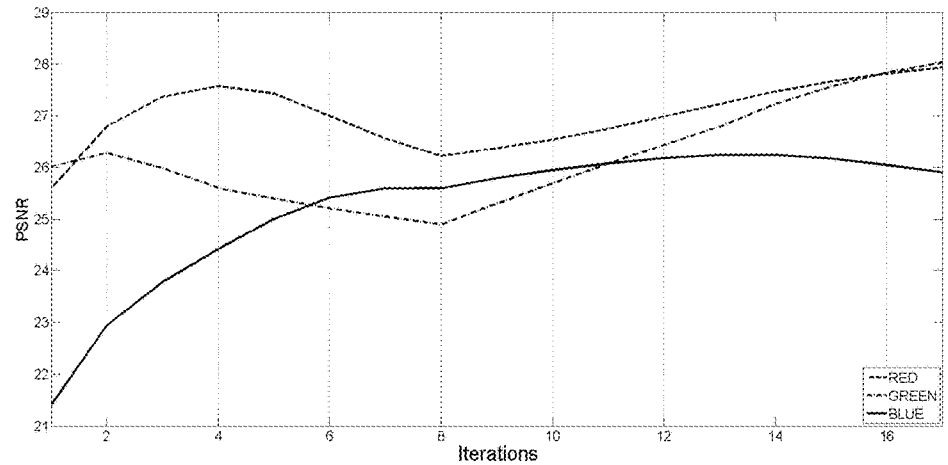
FIG. 5 shows the dependence of the PSNR of the restored Red, Green and Blue images on the number of the Bregman iterations.

FIG. 5 shows the dependence of the PSNR of the restored Red, Green and Blue images on the number of the Bregman iterations. The figure illustrates the usefulness of Bregman iterations for restoration of the HS-originated color image from a DD sensor image. As mentioned above, direct reconstruction of only R out of K spectral images, followed by the interpolation of the remaining K−R images, provides significant time and computational resource savings, while practically not degrading the quality of the color image reconstruction.

Figure 6A:
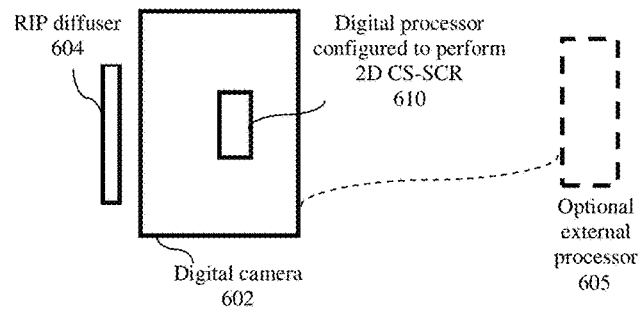
FIG. 6A shows an exemplary embodiment of a monochromatic camera with a clear image sensor that may be used for color imaging as disclosed herein.
Figure 6B:
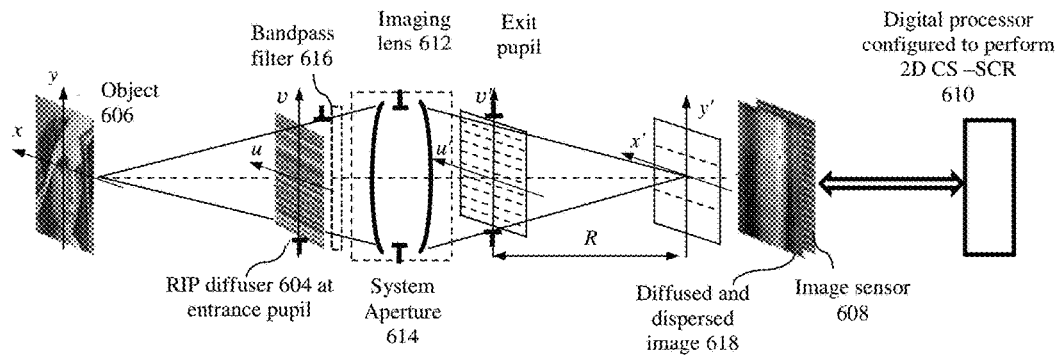
FIG. 6B shows details of elements in the camera of FIG. 6A.

FIGS. 6A and 6B show schematically an embodiment 600 of a monochromatic snapshot spectral imaging (SSI) apparatus (or simply "camera") based on monochromatic digital camera with a restricted isometry property (RIP) diffuser and a clear image sensor. Camera 600 is essentially identical with camera 100 disclosed in PCT/IB2014/062270. Apparatus 600 may be viewed as a digital camera 602 optically coupled to a RIP diffuser 604 positioned between the camera and a source object (606 in FIG. 1B) imaged with the camera. Camera 602 may include components of a regular digital camera such as a lens (not shown), an image sensor 608 and a digital processor 610. The digital camera may be any known camera, for example a SLR camera, a video camera, a cell-phone camera or a miniaturized camera of the type used in gastroscopy or endoscopy. As used herein, "digital camera" may include only the basic elements and functions of an imaging section needed to obtain an image of a source object on a pixelated image sensor. Thus, a lens/sensor combination coupled to an image processor, as present for example in a smart-phone camera, are to be considered an imaging section for purposes set forth herein. A digital camera disclosed here may have both still imaging and video functionalities.

Processor 610 is configured to perform all the functions described for processor 610 in PCT/IB2014/062270, and specifically 2D CS-SCR from the DD image. In addition, processor 610 is configured to perform interpolation of spectral images from directly reconstructed spectral images as explained above. Exemplarily, processor 610 is configured to perform the interpolation using a spline subdivision algorithm, and in particular a binary spline subdivision algorithm as described above. Processor 610 is further configured to reconstruct a color image using directly processed spectral images and interpolated spectral images. Optionally, apparatus 600 may include an added external (to the camera) digital processor 605 configured to perform some or all of the operations performed by processor 610 above.

FIG. 6B provides a more detailed view of apparatus 600. In addition to the components above, camera 600 includes an imaging lens 612 with an aperture 614 and, optionally, a band-pass filter 616. The RIP diffuser 604 may be positioned at or near an entrance pupil of the imaging lens 612. The imaging of object 606 through RIP diffuser 604 and lens 612 provides a snapshot DD image 618 at image sensor 608. The image data associated with image 618 is processed by processor 610, which may be configured to also fulfill other functions such as controlling various camera functions and operations.

Figures 7A, 7B:
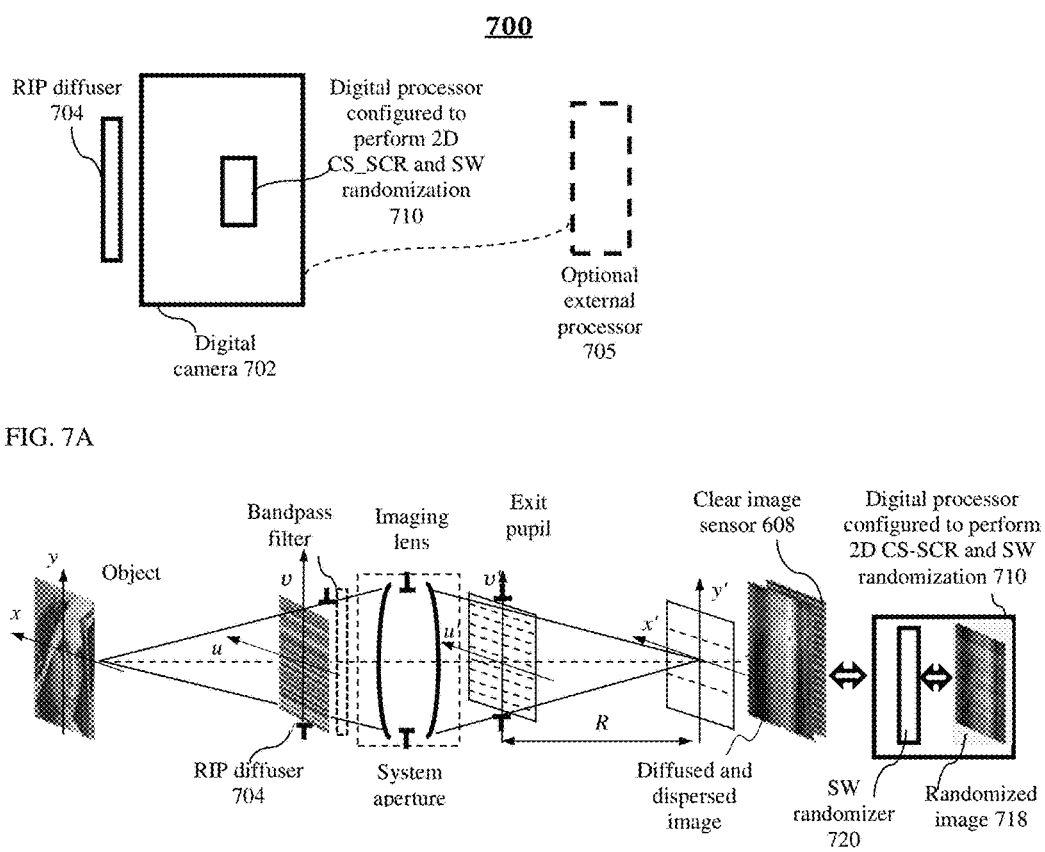
FIG. 7A shows an exemplary embodiment of another monochromatic camera with a clear image sensor that may be used for color imaging as disclosed herein.
FIG. 7B shows details of elements in the camera of FIG. 7A.

FIG. 7A shows schematically an embodiment numbered 700 of another SSI apparatus based on a digital camera 702 with RIP diffuser 704 and a software (SW) randomizer 720 implemented by configuring a digital processor 710 of digital camera 702. More details of apparatus 700 are shown in FIG. 7B. Apparatus 700 also includes a SW randomizer 720. SW randomizer 720 is a software implemented randomizer "function" operating at the image sensor plane. The randomizer provides a diffused, dispersed and randomized image 718 on image sensor 708. Processor 710 is configured to perform 2D CS-SCR from the DDR image and interpolation of spectral images from directly reconstructed spectral images as explained above. Exemplarily, processor 710 is configured to perform the interpolation using a spline subdivision algorithm, and in particular a binary spline subdivision algorithm as described above. Processor 710 is further configured to reconstruct a color image using directly processed spectral images and interpolated spectral images.

The SW randomizer may be replaced by a hardware (HW) implemented randomizer inserted in the optical path between the RIP diffuser and the image sensor. Enabling details may be found in PCT/IB2014/062270.

While this disclosure describes a limited number of embodiments, it will be appreciated that many variations, modifications and other applications of such embodiments may be made. For example, while interpolation of spectral bands and reconstruction of a color image in the simulations above is done only in a last Bregman iteration, these operations may be implemented at the level of each Bregman iteration, starting with a first Bregman iteration. Moreover, Bregman iterations may be interchangeably combined with interpolation at the level of an entire set (or subset) of the iterations, either intermediate or last. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A method for obtaining a color image of an object or scene using a camera having a pixelated clear image sensor without color filters, the method comprising the steps of:
   a) obtaining a diffused-dispersed (DD) image at the image sensor in a snapshot;
   b) processing the DD image to obtain K spectral images in K spectral bands where K≥3; and
   c) reconstructing a color image from the K spectral images.

2. The method of claim 1, wherein the step of obtaining a DD image includes obtaining a diffused-dispersed and randomized (DDR) image.

3. The method of claim 1, wherein the step of processing the DD image includes processing the DD image to provide R<K spectral images in R wavebands and using the R images to obtain K−R interpolated images, and wherein the step of reconstructing a color image from the K spectral images includes reconstructing a color image using the R spectral images and the K−R interpolated spectral images.

4. The method of claim 2, wherein the step of processing the DDR image includes processing the DDR image to provide R<K spectral images in R wavebands and using the R images to obtain K−R interpolated images, and wherein the step of reconstructing a color image from the K spectral images includes reconstructing a color image using the R spectral images and the K−R interpolated spectral images.

5. The method of claim 3, wherein the interpolated images are obtained using a spline subdivision algorithm.

6. The method of claim 5, wherein the spline subdivision algorithm is a binary spline subdivision algorithm.

7. The method of claim 5, wherein each spectral image includes a set X×Y of multipixels, each multipixel including K wavebands, and wherein the interpolation is performed simultaneously on the entire multipixel set.

8. The method of claim 6, wherein each spectral image includes a set X×Y of multipixels, each multipixel including K wavebands, and wherein the interpolation is performed simultaneously on the entire multipixel set.

9. The method of claim 1, wherein the step of reconstructing a color image from the K spectral images includes reconstructing a still color image.

10. The method of claim 1, wherein the step of reconstructing a color image from the K spectral images includes reconstructing a video color image or color frame.

11. A camera for obtaining a color image of an object or scene, comprising:
a) a lens;
b) a pixelated clear image sensor without color filters;
c) diffuser means to obtain in a snapshot a diffused-dispersed (DD) image at the image sensor; and
d) a processor configured to process the DD image into K spectral images in K spectral bands where K≥3, and to reconstruct a color image from the K spectral images.

12. The camera of claim 11, wherein the diffuser means include a restricted isometry property (RIP) diffuser.

13. The camera of claim 12, further comprising a randomizer used in conjunction with the diffuser means to provide a diffused-dispersed and randomized (DDR) image at the image sensor and wherein the processor is further configured to process the DDR image into K spectral images in K spectral bands where K≥3, and to reconstruct a color image from the K spectral images.

14. The camera of claim 12, wherein the processor is further configured to process the DD image to obtain directly R<K spectral images in R wavebands, to interpolate from the R spectral images K−R interpolated spectral images and to reconstruct the color image using the directly processed R spectral images and the K−R interpolated spectral images.

15. The camera of claim 13, wherein the processor is further configured to process the DDR image to obtain directly R<K spectral images in R wavebands, to interpolate from the R spectral images K−R interpolated spectral images and to reconstruct the color image using the directly processed R spectral images and the K−R interpolated spectral images.

16. The camera of claim 13, wherein the randomizer is a hardware randomizer.

17. The camera of claim 13, wherein the randomizer is implemented in software.

18. The camera of claim 14, wherein the processor configuration to interpolate from the R spectral images K−R interpolated spectral images includes a configuration to obtain the K−R spectral images using a spline subdivision algorithm.

19. The camera of claim 18, wherein the. spline subdivision algorithm is a binary spline subdivision algorithm.

20. The camera of claim 15, wherein the processor configuration to interpolate from the R spectral images K−R interpolated spectral images includes a configuration to obtain the K−R spectral images using a spline subdivision algorithm.

21. The camera of claim 20, wherein the. spline subdivision algorithm is a binary spline subdivision algorithm.

22. The camera of claim 11, wherein the color image is a still color image.

23. The camera of claim 11, wherein the color image is a video color image or color frame.

* * * * *